United States Patent [19]

Ellingsen

[11] Patent Number: 5,607,558
[45] Date of Patent: Mar. 4, 1997

[54] METHOD FOR SELECTIVE AND/OR UNSELECTIVE VAPORIZATION AND/OR DECOMPOSITION OF, PARTICULARLY, HYDROCARBON COMPOUNDS AND APPARATUS FOR CARRYING OUT SUCH A METHOD

[76] Inventor: Olav Ellingsen, Kleiva 20, N-6900 Florø, Norway

[21] Appl. No.: 406,918

[22] PCT Filed: Oct. 4, 1993

[86] PCT No.: PCT/NO93/00148

§ 371 Date: Mar. 27, 1995

§ 102(e) Date: Mar. 27, 1995

[87] PCT Pub. No.: WO94/08680

PCT Pub. Date: Apr. 28, 1994

[30] Foreign Application Priority Data

Oct. 9, 1992 [NO] Norway .................................. 923927

[51] Int. Cl.$^6$ ...................................................... B01D 3/00
[52] U.S. Cl. ................. 203/89; 159/6.3; 159/9.1; 159/9.2; 159/11.2; 202/238; 203/14; 203/29; 203/DIG. 6

[58] Field of Search ............... 159/6.3, 9.1, 9.2, 159/11.1, 11.2, DIG. 17; 202/238; 203/14, 29, 89, DIG. 6

[56] References Cited

U.S. PATENT DOCUMENTS

| | | | |
|---|---|---|---|
| 3,255,805 | 6/1966 | Bechard | 202/238 X |
| 3,292,683 | 12/1966 | Biichi et al. | 202/238 X |
| 3,526,484 | 9/1970 | Kilpatrick | 159/11.1 X |
| 3,640,330 | 2/1972 | Javet | 202/238 X |
| 4,536,973 | 8/1985 | Platt, Jr. et al. | 159/9.1 X |
| 4,731,159 | 3/1988 | Porter et al. | 203/89 X |

*Primary Examiner*—Robert J. Warden
*Assistant Examiner*—Krisanne M. Thornton
*Attorney, Agent, or Firm*—Austin R. Miller

[57] ABSTRACT

An apparatus and method for separating the components of and/or decomposing a liquid material, involving the application of an artificial gravitational field to a liquid material by rotating the liquid material in a rotatable vessel. A non-rotatable mechanical member contacts the liquid material while the liquid material is exposed to the artificial gravitational field. The liquid material is thusly subjected to thermomechanical frictional heating.

13 Claims, 6 Drawing Sheets

METHOD FOR SELECTIVE AND/OR UNSELECTIVE VAPORIZATION AND/OR DECOMPOSITION OF, PARTICULARLY, HYDROCARBON COMPOUNDS AND APPARATUS FOR CARRYING OUT SUCH A METHOD

The invention relates to a method for selective and/or unselective vaporization and/or decomposition of, particularly, hydrocarbon compounds in liquid form.

The invention also relates to an apparatus for carrying out selective and/or unselective vaporization and/or decomposition of, particularly, hydrocarbon compounds in liquid form, comprising a process chamber into which the liquid is conducted and where there are provided means for supplying energy to the liquid.

It is proposed, according to the invention, to place the liquid in an artificial field of gravity and to provide a mechanical supply of energy to the liquid in the artificial gravitational field.

In connection with the new apparatus, it is proposed according to the invention that the process chamber be rotatably mounted for the provision of an artificial gravitational field for the liquid in the chamber, and that means be provided within the process chamber for mechanically supplying energy to the liquid when it is located in the gravitational field.

The invention thus relates to a method for mechanically supplying energy to liquids by bringing them into an artificial gravitational field. The process may be so intense that it is possible to achieve a partial evaporation of liquid compounds such as, for example, oil and water and, beyond this, to obtain a previously unknown method for the decomposition of molecular compounds which would otherwise be done in so-called "crackers" at high pressure and temperature. In addition, the method enables the achievement of the fusion of certain molecules such as carbon and hydrogen in oil, for example, so that the oil will be composed of lighter hydrocarbon compounds.

All known techniques for separating various substances in admixture with each other, e.g., oil and water, seek to utilize different typical characteristics of the substances. In a gravel pit the separation of sand and stones is done simply by utilizing the size difference between them. The most predominant difference between the substances used in, e.g., various types of centrifuges is the difference in specific gravity between the substances. These specific gravity differences may, however, be very small. With oil and water, for example, the specific gravity ratio is 0.9:1. This makes the separation of such compounds potentially very difficult. Particularly with small amounts of dispersed oil it is often extremely difficult to separate oil from the water by means of centrifuges.

Thus, to facilitate the separation, particularly of oil and water mixtures representing a grave pollution problem, it would be easier if there were physical properties in the substances that were more distinctive than the specific gravity. With regard to water mixed with other liquid matter and particularly oil, there are several physical conditions that provide greater differences, but which are all the more difficult to use for separation tasks. Such physical properties are thermal and electrical conductivity, calorific capacity, specific heat and, not least, vaporizing heat for various substances. One may, for example, set up the following table for such physical properties:

|  | Water | Oil |
|---|---|---|
| Specific gravity kg/m$^3$ | 1.00 | 0.90 |
| Coefficient of thermal conductivity W/m °C.: | 0.70 | 0.17 |
| Mean specific heat kJ/kg °C.: | 4.22 | 2.75 |
| Vaporizing heat kj/kg: | 2,257 | 275 |
| Evaporation temperature °C.: | 100 | 150–500 |

What is distinctive here is the difference in vaporizing heat, and it is primarily this difference that we seek to exploit in the present invention. If we consider two equally large units V of oil and water and supply these with exactly the same power P, the volume V of oil will evaporate first, in accordance with the following observation with the same initial temperature t=20° C.:

Amount of energy for evaporation of the water is:

$$Q_v = V \cdot [(100-20) \cdot 4.2 + 2257] = 2,293 \ V \ kJ$$

For the oil, when calculated with a mean evaporation temperature of (150+500)/2=325° C., this is:

$$Q_2 = V[325-20) \cdot 2.75 + 275] = 1,114 \ V \ kJ$$

This shows that 2.593/1.114=2.93 times more energy is required to evaporate the same amount of water as oil, and the oil will consequently evaporate 2.33 times faster than the water.

The evaporation temperature shown for the oil is the range for typical unrefined crude oil. If the oil is refined, i.e., cracked to lighter oil fractions, the evaporation will be easier. The same is the case if one were to concentrate the energy supply to the highest possible degree on the oil and to the least possible degree on the water.

The invention aims to use all these physical properties together with a decomposition of oil in order to achieve a reduction in the evaporation temperature. This is done by placing the liquid mixture, here concentrating on oil/water, into a rotating container (drum) whereby the centrifugal force will hurl the mixture against the walls and supply it with a g force expressed through $g=v^2/r=m/s^2$ where v=the peripheral speed and r is the radius of the container. On insertion of a rod down into the rotating liquid ring, a hydrodynamic energy transfer will take place. If the area of the rod inserted into the liquid is A, and the average specific gravity of the liquid is $\mu$, the power transfer is expressed as $P=A \cdot v \cdot \mu \cdot v \cdot v = A\mu v^3$ Watt. This means that the energy transfer increases by the third power of the peripheral speed. Adjusted for the revolutions n per min., the expression is $P=A\mu(\pi 2rn/60)^3$ Watt.

Since the mass is placed in a rotating system which subjects it to the same gravitational forces as in a centrifuge, the difference in specific gravity between the oil and the water also will be manifested by the fact that the water is moved furthest out against the container's wall and the oil moves toward the center, i.e., the interior liquid surface. This means that on insertion of the rod so far down into the liquid that it is only the oil which is substantially touched, the major portion of the energy transfer will take place there, allowing the oil to be evaporated off first.

Due to the strong gravitational field that can be established in such a system, it is possible to provide an exceptionally high specific energy supply per surface unit. It has been shown in trials that over a specific peripheral speed range, there also occurs, in addition to the evaporation, a decomposition of the hydrocarbons into lighter fractions at a temperature up to 50% lower than with pure thermal decomposition. This is explained by the fact that, in addition to the thermal stimulation causing the molecules to oscillate, there are also provided vibrations caused by the mechanical working of the liquid through the effect of the rod inserted therein. This phenomenon, which has not been demonstrated previously, will hereafter be referred to as thermomechanical decomposition.

In other respects, this phenomenon renders the invention useful for the decomposition of hydrocarbons in petroleum products, the method thus paving the way for the direct refining and/or pretreating of oil or oil residue from oil refineries. At the same time that it is possible to decompose various hydrocarbon compounds having the general formula $C^nH_n+2-z$ into lighter compounds, it is also possible to form lighter compounds from the carbon compounds in petroleum which under normal conditions form coke, by introducing a reactive gas such as hydrogen into the process chamber so that it reacts with the carbon and forms the above mentioned compounds or other new compounds.

In an oil refinery the crude oil is typically heated up to form hydrocarbon gas using gas as an energy source and distilled in a distillation column where a number of light fractions are removed from the oil. The heavier fractions constituting about 25% of the crude oil are withdrawn at the bottom end of the distillation column. If the crude oil is a light oil having small amounts of nitrogen, sulphur, heavy metals and wax, the distillation residue may be further processed in a so-called cracker. This is an enormous unit which, for a typical refinery with a capacity of 150,000 barrels of oil per day, costs about 4 billion norwegian kroner. In the cracker the residue together with various catalysts is subjected to varying pressure and a temperature of about 550° C. The decomposed residue is then vaporized using gas as the energy source and conducted into a new distillation column where the individual fractions are removed as in the first distillation column.

If the crude oil is heavy, i.e., contains elements of the aforementioned "contaminants", the residue must be pretreated before being fed into the cracker. The pretreatment consists, inter alia, of "hydrogenating" the residue by adding hydrogen in order to form lighter compounds and, otherwise, to succeed in removing as much of the "contaminants" as possible. For the same refinery such a unit would typically cost 2 billion norwegian kroner.

With the process of the present invention, it is possible to use the apparatus both for pretreatment of the residue and as a direct cracking unit. Since the oil in the process emerges as a decomposed oil gas, the gas stream may be conducted directly into the distillation column or into a condenser where the gases are condensed down to liquid. The process would thus replace the above mentioned cracker and pretreater of the residue.

BRIEF DESCRIPTION OF THE DRAWINGS

The process is described in more detail in the following drawings:

FIG. 1a is a schematic description of an apparatus in accordance with the invention.

FIG. 1b is an exploded schematic depiction of an interior portion of the rotating drum shown in FIG. 1a.

FIGS. 1a and 1b are schematic presentations of the process. 1 is the rotating drum which, mounted on bearings 2, is driven by a rotating energy source 3. Within drum I is disposed a tubular shaft 4 securely anchored at one end thereof. On the end projecting into the drum are arranged a plurality of arms 5 having a breadth b and extending a distance n down into the liquid 6 in the drum. Against wall 7 of the drum is disposed a rotating stuffing box 8 having an aperture 9 therein for connection of a gas pipe 10. In tubular shaft 4 is also provided a second pipe 11 that passes down into the liquid 6. At this end of the pipe is provided a 90° bend 12 with its opening toward the direction of rotation of the drum, ensuring that if the liquid level in the drum rises up to the bend, the liquid will be pumped out of the drum by the centrifugal force. In other words, the pipe functions as a level regulator and discharge pipe for the liquid to be tapped out from the process.

Figure 1:
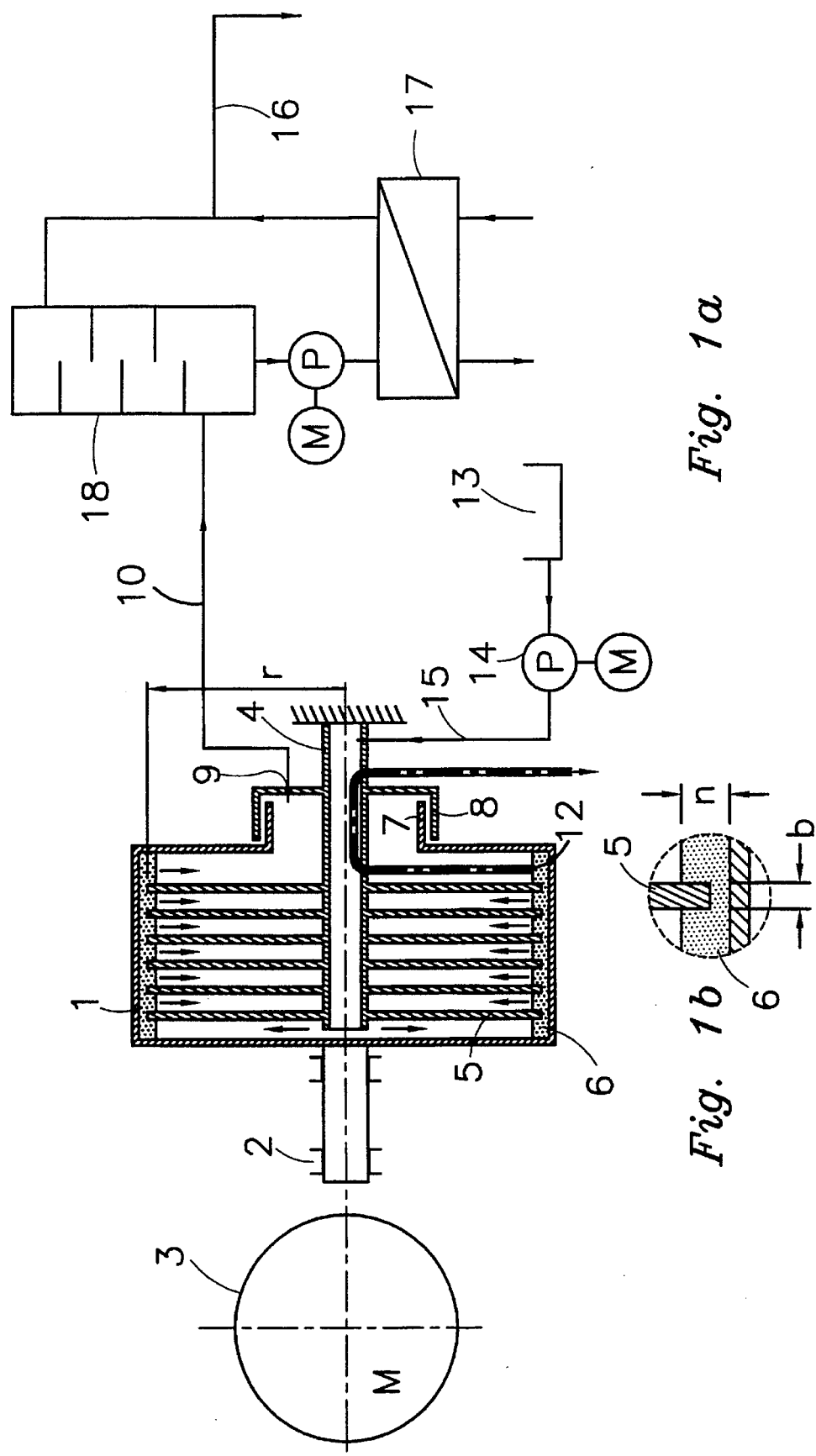

The feed liquid to be processed is conducted into tubular shaft 4 from tank 1S by pump 14 through pipe 15. The gases that evaporate in the process chamber are fed through gas pipe 10 to a condenser 18, which may also be a conventional distillation column for the separation of different oil fractions.

The condensate is discharged from pipe 16. The condensation heat is removed from the system by the heat exchanger 17, which is cooled with water.

Figure 2:
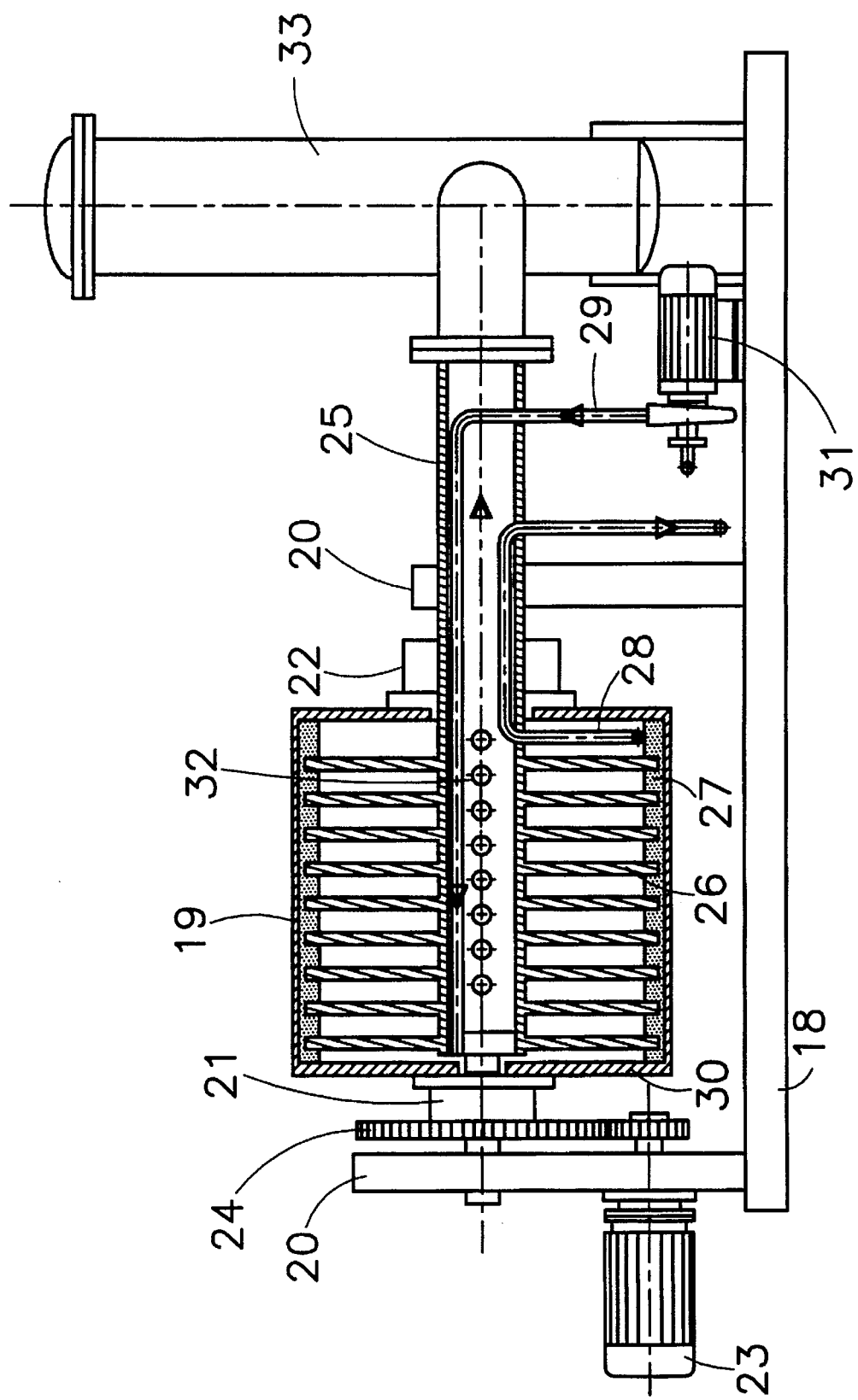
FIG. 2 is a schematic elevational view of an apparatus in accordance with the invention, taken partially in section for ease of understanding.
Figure 3:
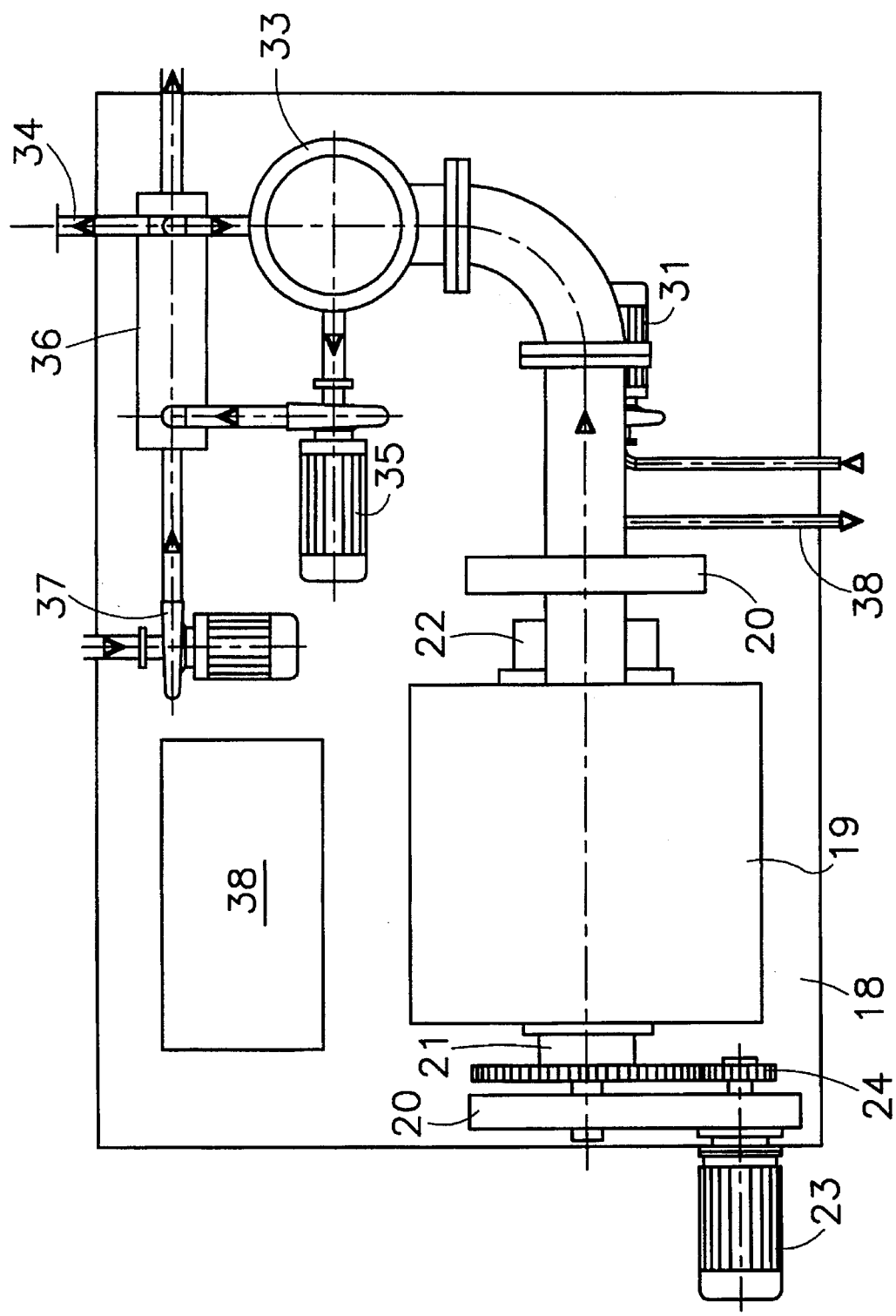
FIG. 3 is schematic top view of the apparatus shown in FIG. 2.

FIGS. 2 and 3 are a partially intersected elevation and a top view of a practical embodiment of the process. The machinery is mounted on a skid 18. The container (drum) 19 is mounted on two bearing blocks 20 via a rotating stuffing box 21 at the drive end and a stuffing box 22 at the other end of the drum. The drum is driven by a motor 23 with a gear transmission 24 that may be arranged in a number of ways. On the central tubular shaft 25 are arranged a row of arms 26 projecting down into the liquid 27. On the central tubular shaft are also provided a level regulator pipe 28 and a separate feed-in pipe 29 which leads toward the end plate 30 of the drum. The feed is pumped in by pump 31. By this arrangement the vapor and gases are conducted into the central tubular shaft via apertures 32 therein and are fed further into the condenser 33. The condensate is withdrawn from pipe 34 with the aid of circulation pump 35, and the condensation heat is removed by heat exchanger 36, which is cooled with water supplied by pump 37. The process is otherwise regulated by associated electronic equipment situated in control cabinet 38.

Figure 4:
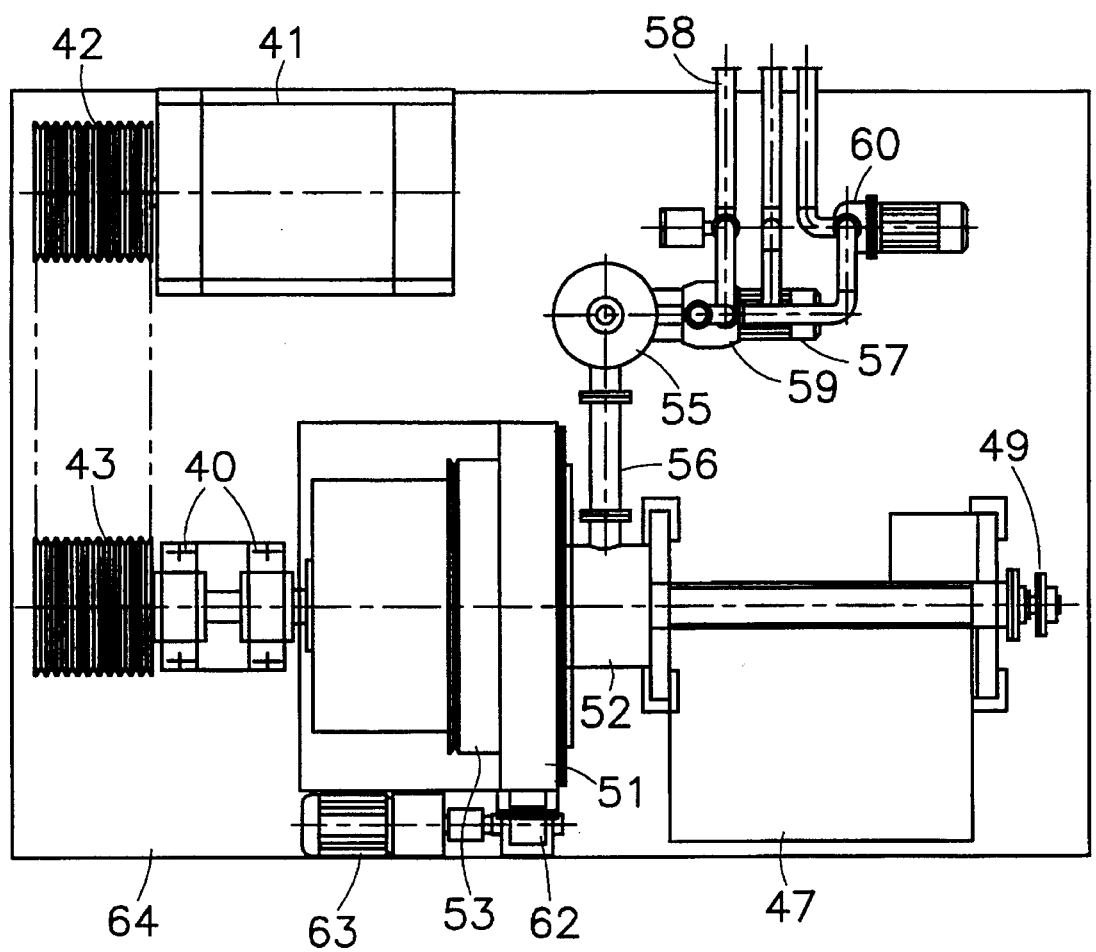
FIG. 4 is a schematic top view of an apparatus in accordance with the invention.
Figure 5:
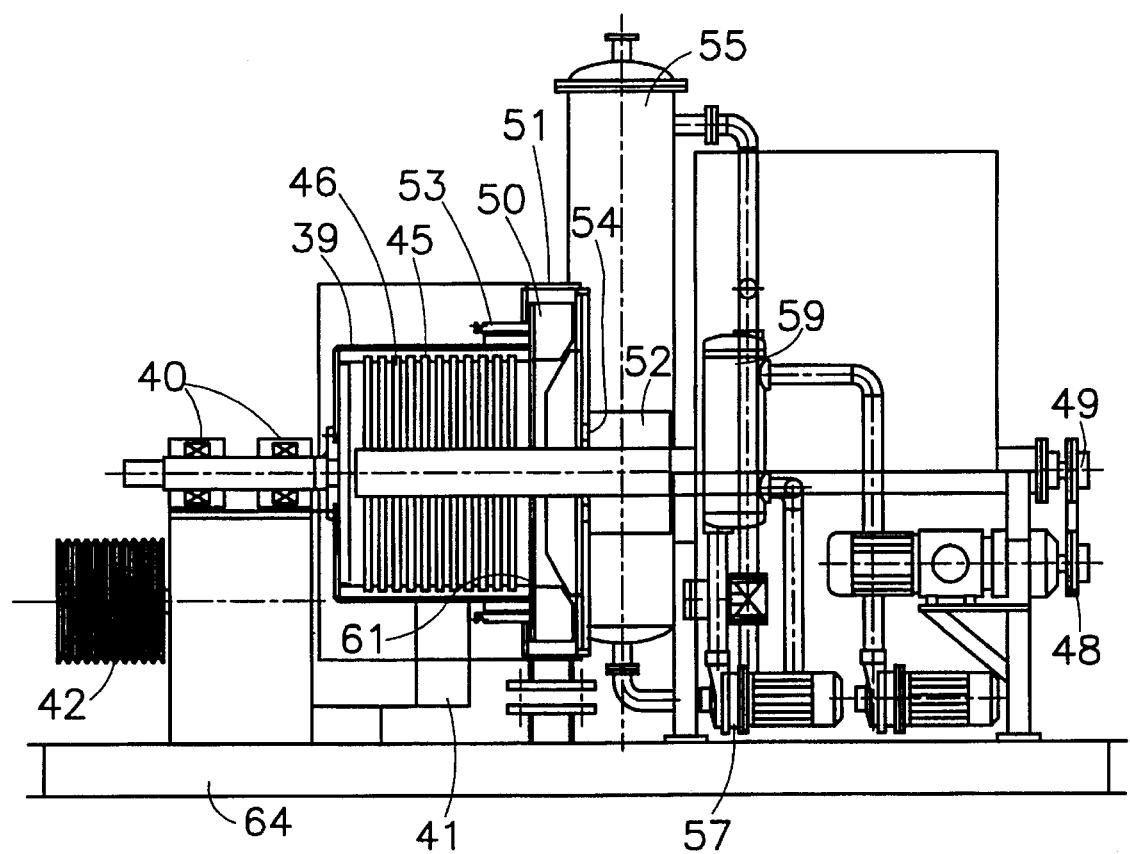
FIG. 5 is a schematic elevational view of the apparatus shown in FIG. 4.
Figure 6:
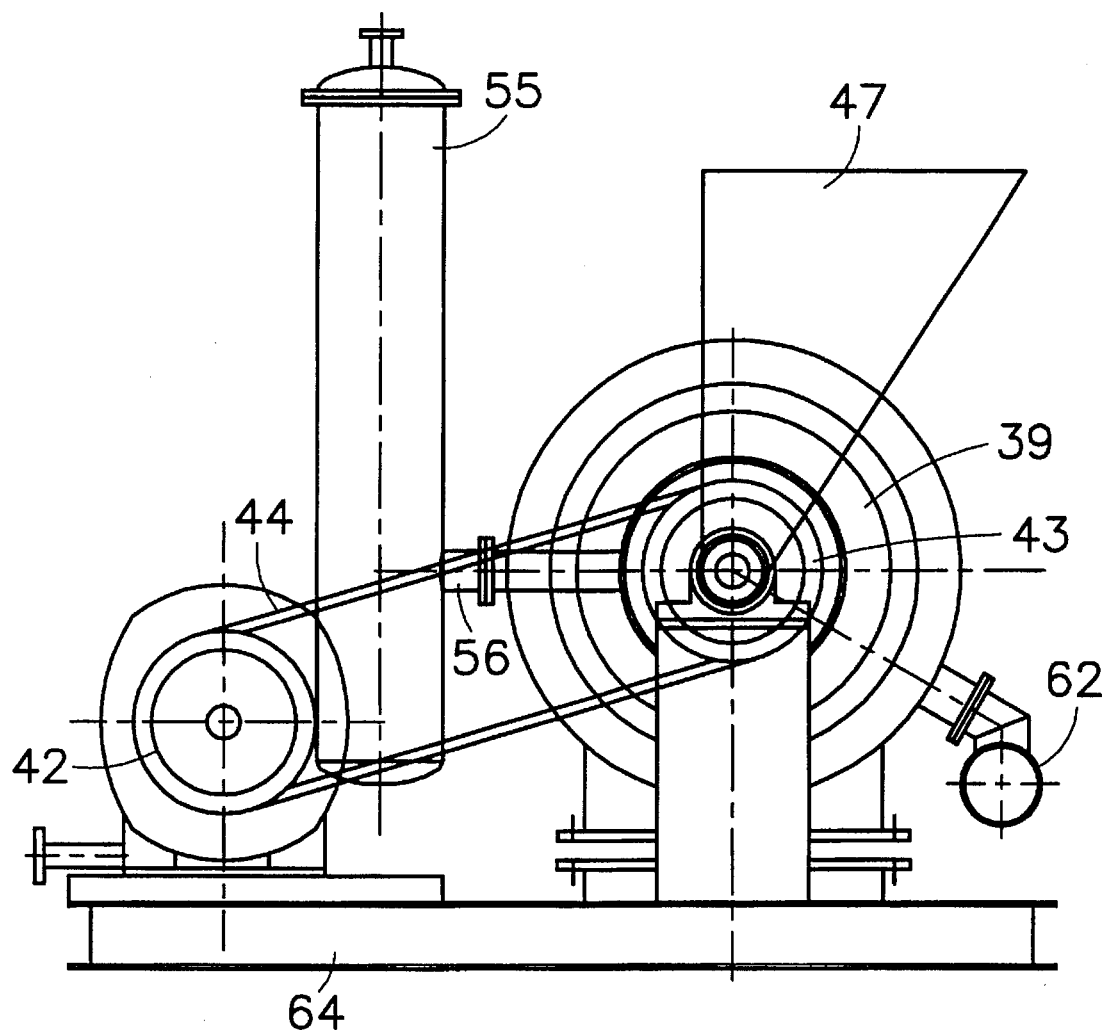
FIG. 6 is another schematic alevational view of the apparatus shown in FIG. 4.

FIGS. 4, 5 and 6 are a top view and two side views (schematic) of another practical embodiment of a unit for treating fluid containing solids which are not removable by evaporation. Such solids may be residues from catalysts and other mineral contaminants. Drum 39 is here mounted at the drive end with bearings 40 and is driven by the motor 41 via V-belt pulleys 42 and 43 and V-belts 44. The central tubular shaft 45 with its arms 46 is attached to a hopper 47 in which is put the liquid that is to be pumped in. This liquid is fed into drum 99 by a screw mechanism disposed in central tubular shaft by the motor 48 via the sprocket wheel arrangement 49. At the outlet of drum 99 are provided a row of blades 50 projecting into a housing 51 attached with a bubble cap 52 to the central tubular shaft. On housing 51 is, in addition, provided a gas-tight stuffing box arrangement 59. The vapors and gases leave the drum via aperture 54 and are fed to the condenser 55 through the pipe. The condensate is withdrawn with the aid of circulation pump 57 through pipe 58. The condensation heat is removed through heat exchanger 59, which is cooled with water supplied by pump 60. The solids accumulating in the liquid in the drum are sent over the edge 51 as a result of continuous infeeding of liquid and are hurled against housing 51 by blades 50 and further out through a rotating gate 52 driven by motor All components are mounted on a machine skid together with a control cabinet, not shown.

To test the process a small pilot model of about 50 kW was constructed. This was tested with a residue substance from oil shale production in Estonia, called "fushi" in Russian. This consists of unrefined shale oil and finely divided minerals together with water, phenols and other contaminants. Despite the fact that the oil has a final boiling point of about 550° C., it was possible to attain recovery of the oil at 250° C. together with a reduction of the final boiling point to about 500° C. The analytical data for the results are given in the following table.

| Ref. | | 1 | 8 | 11 |
|---|---|---|---|---|
| Oil shale and "fushi" Ref. 1: Oil shale Ref. 8: Primary oil "fushi" Ref. 11: Secondary oil shale | | | | |
| Benzo (a) pyrene | ppm | | 38 | 1.4 |
| Phenols | ppm | 42/126 oil/water | 33 | 210/56 oil/water |
| Resorcinol oil | ppm | 1230/180 | 21 | 22/83 |
| m- and p-cresol | ppm | <10 | 26 | 105/4.9 |
| Distillation °C. | | | | |
| IP (initial boiling point) | | 151 | 196 | 150 |
| 20% | | 320 | 272 | 258 |
| 50 | | 400 | 310 | 297 |
| 80 | | 492 | 385 | 360 |
| FP (final boiling point) | | 548 | 498 | 500 |
| Process temperature about 250° C. | | | | |

The invention is described above as an apparatus where the process chamber is brought into rotation about its center axis in order to establish the artificial gravitational field. The invention is not limited to this structural embodiment. The essential feature is that there may be established an artificial gravitational field where the liquid is mechanically supplied with energy. In this respect, hurling devices could also be relevant alternatives.

What is claimed is:

1. A method for separating components contained in a liquid material, the steps which comprise:
    placing said liquid material in a rotatable vessel having an axis of rotation,
    rotating said vessel containing said liquid material to expose said liquid material to an artificial gravitational field, and
    contacting said liquid material with a frictional non-rotating member while said liquid material is exposed to said artificial gravitational field, said frictional non-rotating member being non-rotatable with respect to said axis of rotation of said vessel,
    placing said liquid material in motion relative to said frictional non-rotating member, thereby creating thermomechanical frictional heating of said liquid such that,
    at least a portion of said liquid material is separated from said liquid material.

2. The method according to claim 1, further comprising contacting said liquid material and said separated portion of said liquid material with a reactive gas to form a new chemical compound.

3. The method according to claim 2, wherein said reactive gas is hydrogen.

4. A method for decomposing a liquid material, the steps which comprise:
    placing said liquid material in a rotatable vessel having an axis of rotation,
    rotating said vessel containing said liquid material to expose said liquid material to an artificial gravitational field, and
    contacting said liquid material with a frictional non-rotating member being non-rotatable with respect to said axis of rotation of said vessel, while said liquid material is exposed to said artificial gravitational field, said liquid material being in motion relative to said member, thereby creating thermomechanical frictional heating of said liquid such that
    at least a portion of said liquid material is decomposed to form a decomposed material.

5. The method according to claim 4, further comprising contacting said liquid material and said decomposed material with a reactive gas to form a new chemical compound.

6. The method according to claim 5, wherein said reactive gas is hydrogen.

7. The method according to claim 1 or 4, wherein said liquid material comprises at least two components having different specific gravities and wherein said liquid material forms layers when exposed to said artificial gravitational field based upon said different specific gravities of said components, and further wherein said non-rotating member contacts only one of said layers.

8. The method according to claim 1 or 4, wherein said non-rotating member is a rod.

9. An apparatus for separating components of and/or decomposing a liquid material, comprising:
    a tubular shaft defining a central duct therein, said tubular shaft having a first portion and a second portion,
    a substantially cylindrical process chamber rotatably engaged with and surrounding said first portion of said tubular shaft, said process chamber having an axis of rotation, said process chamber also being in communication with said central duct,
    a liquid inlet pipe positioned on said second portion of said tubular shaft, said liquid inlet pipe being in communication with said central duct,
    a rotating stuffing box positioned on said process chamber and in rotatable engagement with said first portion of said tubular shaft,
    a vapor outlet port positioned on said rotating stuffing box, and in communication with said process chamber, and
    a frictional non-rotatable member positioned on said first portion of said tubular shaft and extending radially therefrom, said member being non-rotatable with respect to said axis of rotation of said process chamber.

10. An apparatus for separating components of and/or decomposing a liquid material, comprising:

a tubular shaft defining a central duct, said tubular shaft having a first portion and second portion, a substantially cylindrical process chamber rotatably engaged with and surrounding said first portion of said tubular shaft, said process chamber having an axis of rotation, a liquid inlet pipe entering said second portion of said tubular shaft, extending through said central duct, and having an outlet at said first portion of said tubular shaft, said outlet being in communication with said process chamber, a vapor outlet port positioned on said first portion of said tubular shaft within said process chamber, said vapor outlet port being in communication with said process chamber and said central duct, a frictional non-rotatable member positioned on said first portion of said tubular shaft and extending radially therefrom, said member being non-rotatable with respect to said axis of rotation of said process chamber.

11. The apparatus according to claim 9 or 10, wherein said non-rotatable member is a rod.

12. An apparatus according to claim 9 or 10, further comprising a stationary housing positioned on said process chamber such that a portion of said process chamber projects into said stationary housing, said process chamber further comprising an overflow edge positioned on said portion of said process chamber which projects into said stationary housing, said apparatus further comprising blades rotatably engaged with said first portion of said tubular shaft, said blades being positioned inside said stationary housing and adjacent to said overflow edge.

13. An apparatus according to claim 11, further comprising a stationary housing positioned on said process chamber such that a portion of said process chamber projects into said stationary housing, said process chamber further comprising an overflow edge positioned on said portion of said process chamber which projects into said stationary housing, said apparatus further comprising blades rotatably engaged with said first portion of said tubular shaft, said blades being positioned inside said stationary housing and adjacent to said overflow edge.

* * * * *

UNITED STATES PATENT AND TRADEMARK OFFICE
CERTIFICATE OF CORRECTION

PATENT NO. : 5,607,558
DATED : March 4, 1997
INVENTOR(S) : Olav Ellingsen

It is certified that error appears in the above-indentified patent and that said Letters Patent is hereby corrected as shown below:

Column 2, line 23, please change "$Q_v=V \cdot [(100-20) \cdot 4.2+2257] = 2,293\ V\ kJ$" to --$Q_v=V \cdot [(100-20) \cdot 4.2+2257] = 2,593V\ kJ$ Column 4, line 30, please change "1S" to --13--.

Column 5, line 1, please change "99" to --39--;
line 2, after "shaft" insert --45--;
line 3, please change "99" to --39--;

line 7, please change "59" to --53--;

line 13, please change "51" to --61--;

line 15, please change "52" to --62-- and after "motor", please insert --63.--;

UNITED STATES PATENT AND TRADEMARK OFFICE
CERTIFICATE OF CORRECTION

PATENT NO.    : 5,607,558         Page 2 of 2
DATED         : March 4, 1997
INVENTOR(S) : Olav Ellingsen It is certified that error appears in the above-indentified patent and that said Letters Patent is hereby corrected as shown below:

line 16, please insert --64-- after "skid"; and line 24, please change "550°C" to --650°C--.

Signed and Sealed this

Fifth Day of August, 1997

Attest:

BRUCE LEHMAN

Attesting Officer     Commissioner of Patents and Trademarks